United States Patent [19]

Aoki et al.

[11] Patent Number: 4,885,566
[45] Date of Patent: Dec. 5, 1989

[54] APPARATUS FOR DETECTING THE WEARING OF A SEAT BELT ASSEMBLY

[75] Inventors: Kohji Aoki, Nagoya; Tomio Yasuda, Kasukabe; Masanori Sugiyama, Nishio; Osamu Komazawa, Nagoya, all of Japan

[73] Assignee: Aisin Seiki Kabushiki Kaisha, Kariya, Japan

[21] Appl. No.: 136,927

[22] Filed: Dec. 22, 1987

[30] Foreign Application Priority Data

Dec. 22, 1986 [JP] Japan ................................ 61-305926
Dec. 23, 1986 [JP] Japan ................................ 61-307063
Feb. 25, 1987 [JP] Japan ................................ 62-042242

[51] Int. Cl.$^4$ ............................................ B60Q 11/00
[52] U.S. Cl. ................................................ 340/457.1
[58] Field of Search ..................... 340/52 E, 573, 687, 340/457.1, 457; 307/105 B, 10.1; 280/801

[56] References Cited

U.S. PATENT DOCUMENTS

| | | | |
|---|---|---|---|
| 2,996,587 | 8/1961 | McCarthy | 340/687 X |
| 3,864,668 | 2/1975 | Bickford | 340/52 E |
| 3,874,474 | 4/1975 | Quantz | 340/52 E X |
| 3,898,472 | 8/1975 | Long | 307/105 B |
| 3,912,939 | 10/1975 | Quantz et al. | 307/105 B |
| 4,015,236 | 3/1977 | Boudeville | 340/52 E |

Primary Examiner—Joseph A. Orsino
Assistant Examiner—Brian R. Tumm
Attorney, Agent, or Firm—Banner, Birch, McKie & Beckett

[57] ABSTRACT

A wearing condition of a seat belt assembly is detected while considering a difference in a preferred mode of the seat belt assembly between the presence and the absence of a personnel who is seated upon a seat. In the prior art arrangement, in which a mechanical coupling of a seat belt assembly is considered alone, an alarm may be given off in the absence of the coupling. This may result in giving off an alarm for a vacant seat on which no personnel is seated. Such inconvenience is completely eliminated in accordance with the invention in which a decision differs between the presence or absence of a seating. The relationship between a webbing and a personnel sitting on the seat is analyzed, whereby an anomaly in the wearing condition such as sitting over the webbing after coupling the seat belt assembly can be detected.

50 Claims, 13 Drawing Sheets

APPARATUS FOR DETECTING THE WEARING OF A SEAT BELT ASSEMBLY

BACKGROUND OF THE INVENTION

The invention relates to an apparatus for detecting the wearing of a seat belt assembly which is provided in an automobile or the like, and more particularly, to such an apparatus which prevents the failure of wearing a seat belt by producing an alarm when such failure is detected.

An automobile is usually provided with a seat belt assembly which is effective to restrain an occupant sitting on a seat against collision against a steering wheel in the event of an emergency. Such seat belt assemblies are essential to secure the safety of an occupant, who maybe legally obliged to wear it.

Generally an occupant couples a tongue plate with a buckle of a seat belt assembly and then extends its webbing around his body each time he gets into a vehicle, and uncouples the assembly by a reverse procedure when getting out of a vehicle. Because such operation is unfamiliar in routine life, there are occurrences that an occupant who is not accustomed to riding in an automobile frequently forgets to wear a seat belt assembly.

To accommodate for this, many automobiles are provided with a detector switch which detects the coupling between the buckle and the tongue plate of the seat belt assembly. A failure of wearing the seat belt assembly may be warned by energizing an alarm such as a warning lamp or buzzer for a given time interval if the detector switch indicates the absence of the coupling when an ignition switch is turned on or when an engine is turned on.

Considering an automobile which is provided with a passenger seat located alongside a driver's seat, if a driver gets into the automobile alone, a seat belt assembly associated with a passenger seat is obviously not worn, and according to the logic mentioned above, a warning will be given to a passenger who is actually absent. This would be a procedure which is much too troublesome. For this reason, in the prior art practice, the warning period has been limited to a predetermined time interval from the turn-on of the ignition switch or to a time interval from the turn-on of the ignition switch until either detector switch indicates the presence of a coupling.

However, when such limitation is employed, the following inconveniences can result.

First, if a driver gets into a vehicle after the predetermined time interval has elapsed from the turn-on of the ignition switch, there is no annunciation of a failure to wear the seat belt assembly. This would be the case when boarding after a period of warm-up or when a driver has turned the engine on, but then gets out and subsequently gets in again.

Second, if either occupant wears his seat belt assembly, the failure to wear the seat belt by another occupant cannot be annunciated. This would be the case when a driver has initially gotten into the automobile and has worn the seat belt assembly, followed by the boarding of another occupant.

It is an object of the invention to provide an accurate detection of the wearing of a seat belt assembly.

SUMMARY OF THE INVENTION

In accordance with the first embodiment of the present invention an apparatus for detecting the wearing of a seat belt assembly of a vehicle seat is provided. The apparatus includes a seat belt assembly having a belt which may be disposed around an occupant of the vehicle seat. A belt electrode is disposed in at least a portion of the belt. A detecting electrode is positioned so as to produce an electric field between the belt electrode and the detecting electrode which passes through at least part of an occupant seated on a vehicle seat when the belt is disposed around the occupant. A capacitance detector detects the capacitance formed between the belt electrode and the detection electrode. A monitor responsive to changes in the detected capacitance monitors the detected capacitance to determine whether said belt is disposed around an occupant of said vehicle seat.

In another embodiment of the present invention, an apparatus for detecting the wearing of a seat belt assembly of a vehicle seat is provided. The seat belt assembly includes selectively engagable fastening means for selectively fastening said seat belt assembly. A fastening detector provides a first positive detector when a seat belt assembly is fastened. A seating detector provides a second positive detection when an occupant is seated on the vehicle seat. The seating detector includes a seating detecting electrode and a ground electrode which generate an electric field therebetween passing through at least part of an occupant of the vehicle seat. The capacitance detector for detecting the capacitance between the seating detecting electrode and the ground electrode, and a monitor for monitoring the detecting capacitance, a monitor determining that an occupant is seated on the vehicle seat if an increase per unit time of the detected capacitance exceeds a predetermined value. The apparatus further includes a device for determining an anomoly in the wearing of the seat belt assembly when only one of the first and the second positive detections is provided.

Yet, another embodiment of an apparatus for detecting the wearing of a seat belt assembly of a vehicle seat is provided. The apparatus includes a seat belt assembly having a belt which may be disposed around an occupant of the vehicle seat and a selectively engagable fastening means for selectively fastening said seat belt assembly. The seat belt assembly is properly worn when the fastening means is engaged and the belt disposed around an occupant of the vehicle seat. The apparatus further includes a fastening detector for providing a first positive detector when the seat belt assembly is fastened, a seating detector for providing a second positive detection when an occupant is seated on the vehicle seat, and a lacing detector for providing a third positive detection when the belt is disposed around an occupant of the vehicle seat. An anomoly in the wearing of the seat belt assembly is determined when only one or two of the first, the second, and the third positive detections are provided.

A further analysis of features of the seat belt assembly will enable the wearing condition to be detected in a more detailed manner, which will be described below in the following description of embodiments of the invention with reference to the drawings.

BRIEF DESCRIPTION OF THE DRAWINGS

FIG. 10b is a perspective view, partly broken away, of the webbing 10 shown in FIG. 10a;

DESCRIPTION OF EMBODIMENTS

Figure 1:
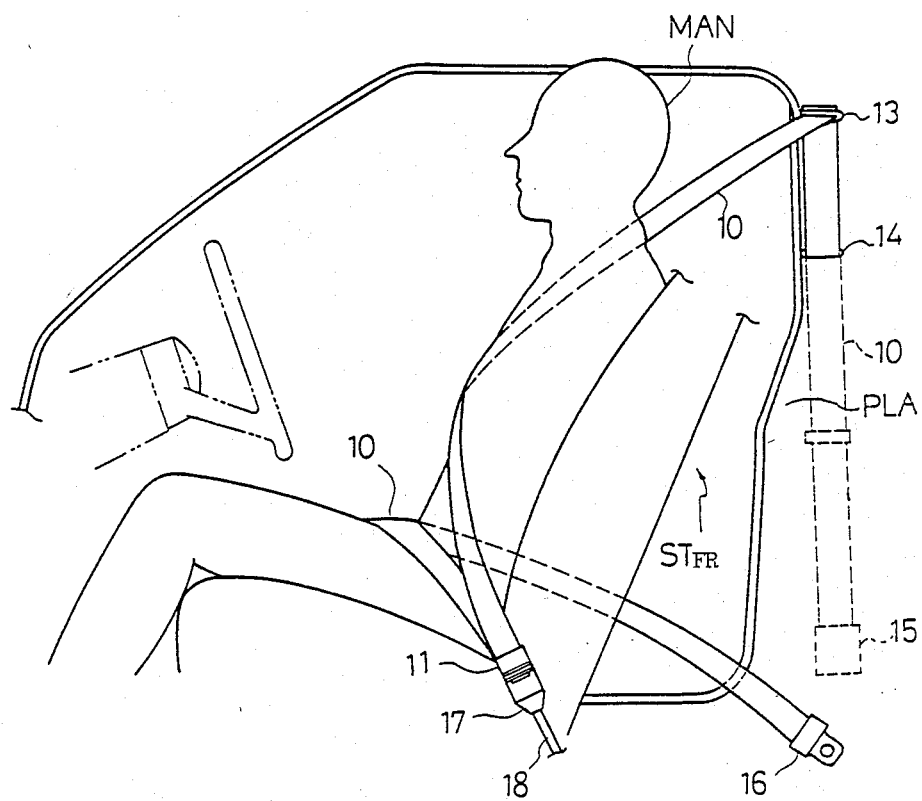
FIG. 1 is a side elevation of a driver wearing a seat belt assembly, as viewed from the inboard side, illustrating the appearance of a mechanism which is common to each embodiment.

Referring to FIG. 1, the construction of a seat belt assembly which is common to each embodiment described below will be discussed. FIG. 1 shows an occupant seated upon a front, right-hand (hereafter abbreviated as FR, the same denotation being used as a suffix) seat $ST_{FR}$ or a driver MAN of an automobile wearing a seat belt assembly.

The seat belt assembly comprises a webbing 10, a tongue plate 11 which is displaceably engaged with the webbing 10, a guide ring 13 rockably secured to the top of a center pillar PLA or a shoulder anchor, a wind-up mechanism 15 disposed within the center pillar PLA, an end plate 16 pivotally mounted on the bottom of the center pillar PLA or lap outer anchor, and a buckle 17 secured to the car body on the left-hand side of FR seat $ST_{FR}$ or a lap inner anchor through an extension rod 18.

One end of the webbing 10 is wound around the wind-up mechanism 15 while the other end extends through an opening 14 formed in the center pillar PLA into the interior of the automobile, and then passes through the guide ring 13 to be secured to the end plate 16. When the driver MAN is seated upon FR seat $ST_{FR}$, he pulls out the webbing 10 to couple the tongue plate 11 and the buckle 17 together, thus disposing the webbing 10 around his physical body (hereafter) referred to as wearing of the seat belt.

The wind-up mechanism 15 houses an inertia lock mechanism which locks the webbing 10 in the event a tension is applied thereto in a rapid manner. Thus, the seat belt assembly shown is effective to secure the safety of the driver by preventing a rapid movement of the physical body of the driver MAN in the forward direction as may be caused by a collision, without interfering with a normal operation such as a leaning of the driver to operate a switch of a car radio set, for example.

When the inertia lock mechanism is activated, the physical body of the driver MAN is restrained by the webbing 10 which is supported at three points including the lap outer anchor (the pivotal connection of the end plate 16), the shoulder anchor (the point of securing the guide ring) and the lap inner anchor (the point of securing the extension rod). Accordingly, the seat belt assembly shown is commonly referred to as a three-point seat belt assembly.

Figure 2A:
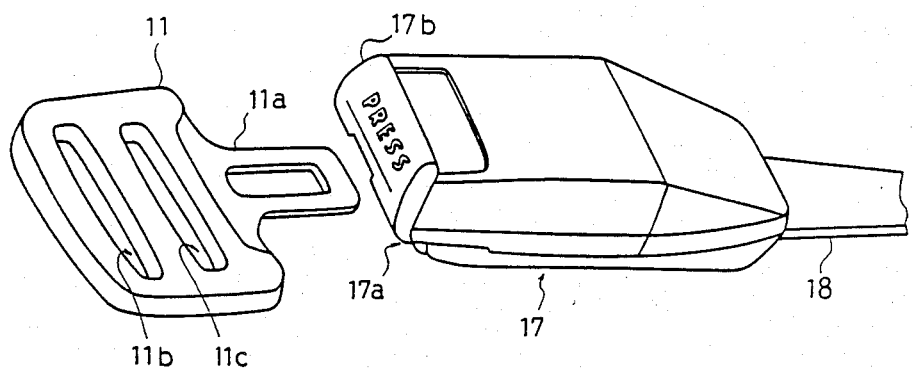
FIG. 2a is a perspective view showing the tongue plate 11 and the buckle 17 of the apparatus shown in FIG. 1 in detail.
Figure 2B:
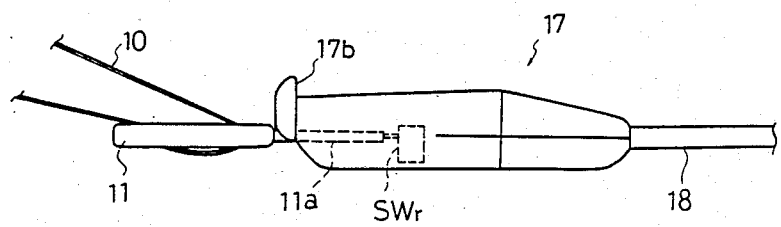
FIG. 2b is a side elevation thereof.

FIG. 2a shows the tongue plate 11 and the buckle 17 in detail. The tongue plate 11 is formed with openings 11b and 11c which allow a belt to pass therethrough. As shown in FIG. 2b, the webbing 10 is passed through these openings. In FIG. 2b, the tongue 11a of the tongue plate 11 is inserted into an opening 17a of the buckle 17, and a latch mechanism located within the buckle 17 seizes the tongue 17a therein, thus achieving the coupled or fastened condition. The buckle 17 is provided with a microswitch (coupling detecting switch) SWr which detects the coupled condition. When the buckle 17 and the tongue plate 11 are coupled together, the leading end of the tongue 11a of the tongue plate 11 depresses a switch knob of the switch, thus turning it on. A pressure knob 17b on the buckle 17 may be depressed under the coupled condition to release the latch mechanism, thus disengaging the tongue plate 11 from the buckle 17. At this time, the switch knob of the switch SWr is returned under the resilience of an internally housed spring to turn the switch off. It is to be noted that an automobile on which the apparatus of the present embodiment is mounted includes another seat belt assembly disposed so as to be worn by an occupant who is seated upon a seat located to the left of the driver and which is constructed in a symmetrical manner with the seat belt assembly mentioned above. The second seat belt assembly also includes a buckle (corresponding to buckle 17) which is provided with a coupling detecting switch SWl.

Figure 3:
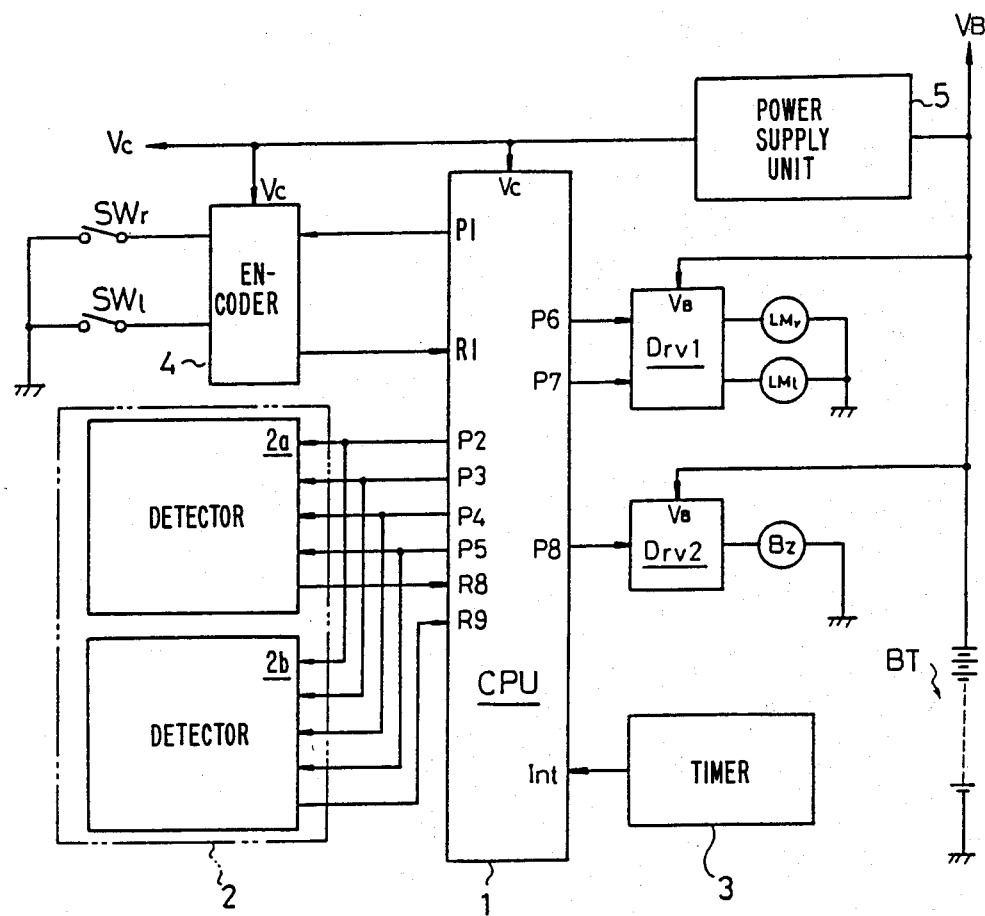
FIG. 3 is a block diagram of an apparatus for detecting the wearing condition of a seat belt assembly which forms part of a first embodiment of the invention.

FIG. 3 is a block diagram of an apparatus for detecting the wearing of a seat belt assembly according to a first embodiment of the invention. The apparatus essentially comprises a microcomputer (hereafter abbreviated as CPU) 1, which functions to monitor the wearing of the seat belt assembly described above and to produce a warning in the event of detecting an anomaly in the wearing of the seat belt assembly.

Connected to CPU 1 are a detector unit 2, a 0.1 second timer 3, a switch encoder 4, a lamp driver Drv1 and a buzzer driver Drv2. The apparatus is fed from an onboard battery BT, and various parts are fed with a battery voltage $V_B$ or a constant voltage Vc which is derived by a constant voltage power supply unit 5, as required.

The lamp driver Drv1 lights an alarm lamp LMr giving a warning about a failure of an occupant seated upon the seat $ST_{FR}$ to wear the seat belt assembly when an output port P6 of CPU 1 assumes H level, lights an alarm lamp LM indicating a failure of an occupant seated upon an FL seat (not shown, representing a front, left-hand seat) to wear the seat belt assembly when an output port P7 assumes H level, and extinguishes the corresponding alarm lamp when each output port returns to its L level.

The buzzer driver Drv2 intermittently energizes a buzzer Bz when an output port P8 of CPU 1 assumes its H level and deenergizes the buzzer Bz when the port assumes its L level.

The switch encoder 4 is connected to the coupling detecting switches SWr and SWl which detect the coupling between the tongue plate (11) and the buckle (17) of the respective seat belt assemblies. The switch encoder 4 reads the status of these switches in response to a command from an output port P1 of CPU 1, and deliver such information to an input port R1 of CPU 1.

The timer 3 has its output terminal connected to an interrupt port Int of CPU 1, thus developing an interrupt request every 0.1 second. In response to the interrupt request from the timer 3, CPU 1 detects the presence or absence of any occupant seated upon the FR seat $ST_{FR}$ and FL seat $ST_{FL}$, using the detector unit 2 which will be described below.

The detector unit 2 comprises a subunit 2a which detects an occupant seated upon FR seat $ST_{FR}$ and another subunit 2b which detects an occupant seated upon FL seat. Since the both subunits are identical in construction, the subunit 2a will be described with reference to FIG. 4. The subunit 2a comprises an oscillator OSC, a counter CTR and a parallel-in and serial-out shift register (hereafter referred to as PS register) PSR.

Figure 4:
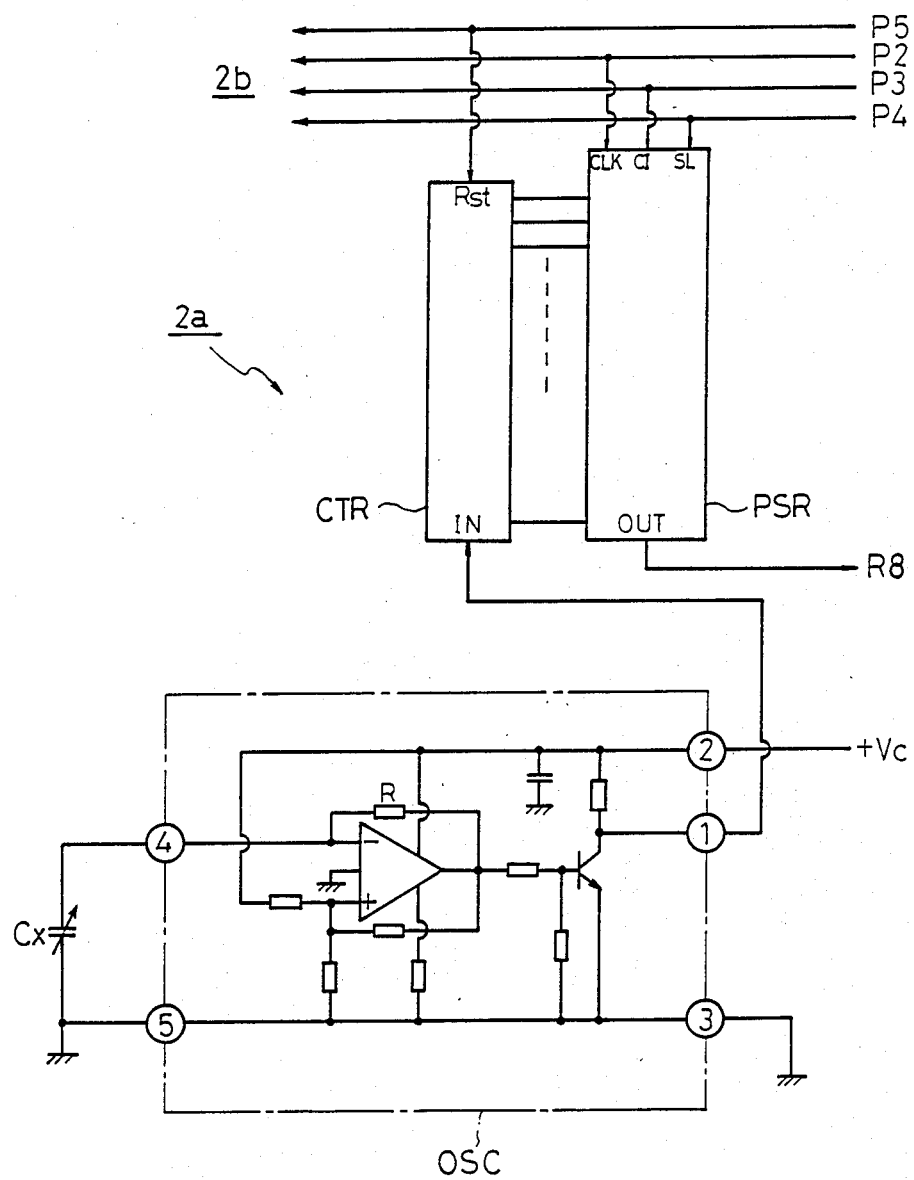
FIG. 4 is a block diagram of a subunit 2a shown in FIG. 3.

The oscillator OSC comprises an astable multivibrator with an external capacitor Cx connected between terminals 4 and 5. In FIG. 4, resistors are indicated by rectangles. By choosing suitable values for the resistors, there can be obtained an output signal of a frequency which is inversely proportional to the product of the capacitance of the external capacitor Cx and the resistance of resistor R. The frequency decreases for an increased capacitance and increases for a decreased capacitance of the external capacitor Cx.

The output signal from the terminal 1 of the oscillator OSC is applied to an input terminal IN of the counter CTR, which counts up in response to the leading end of the output signal. The counter CTR has 16 bit parallel output terminals which are connected to 16 bit parallel input terminals of the PS register PSR. The counter CTR has a reset input terminal Rst, which is connected to an output port P5 of CPU 1.

The register PSR has a clock input terminal CLK connected to an output port P2 of CPU 1, a clock inhibit input terminal CI connected to an output port P3 of CPU 1, and a shift load input terminal SL connected to an output port P4 of CPU 1. The register PSR presets 16 bit data applied to its parallel input terminals into the respective bit positions in response to the leading end of a shift load pulse fed from CPU 1, and serially delivers the preset data from its output terminal OUT to a serial input port R8 of CPU 1 in synchronism with the clock pulse applied to its clock input terminal CLK in response to a change in the clock inhibit signal applied to the clock inhibit input terminal CI from CPU 1 to its low level (L).

Figure 5:
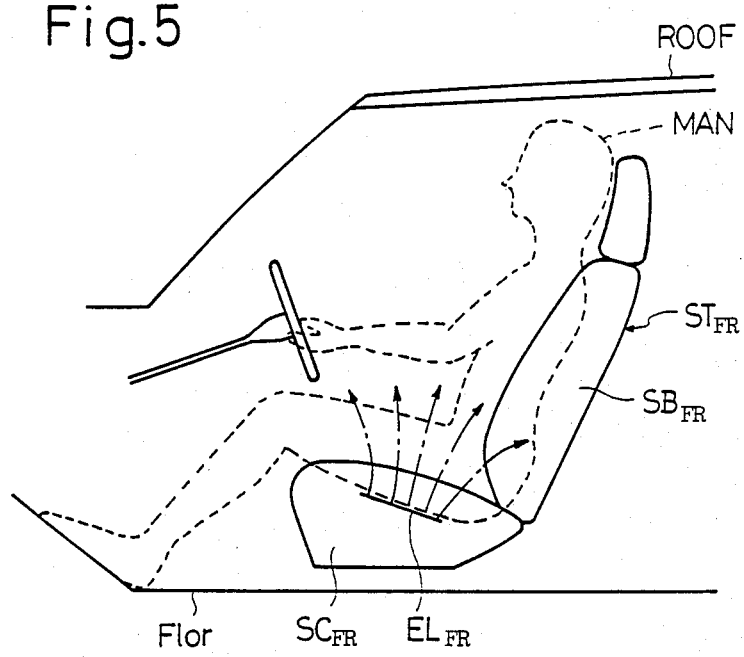
FIG. 5 is a side elevation showing the disposition of a detecting electrode $EL_{FR}$ mounted on a driver's seat $ST_{FR}$.

The capacitor Cx shown in FIG. 4 comprises an occupant detecting capacitor defined between a seating detecting electrode $EL_{FR}$ which is mounted on the seat cushion $SC_{FR}$ of the seat $ST_{FR}$ and the ground electrode defined by the vehicle body such as a roof ROOF or a floor Flor, as shown in FIG. 5. Thus, the seating detecting electrode $EL_{FR}$ is connected to the terminal 4 and the ground electrode is connected to the terminal 5 of the oscillator OSC.

Figure 6A:
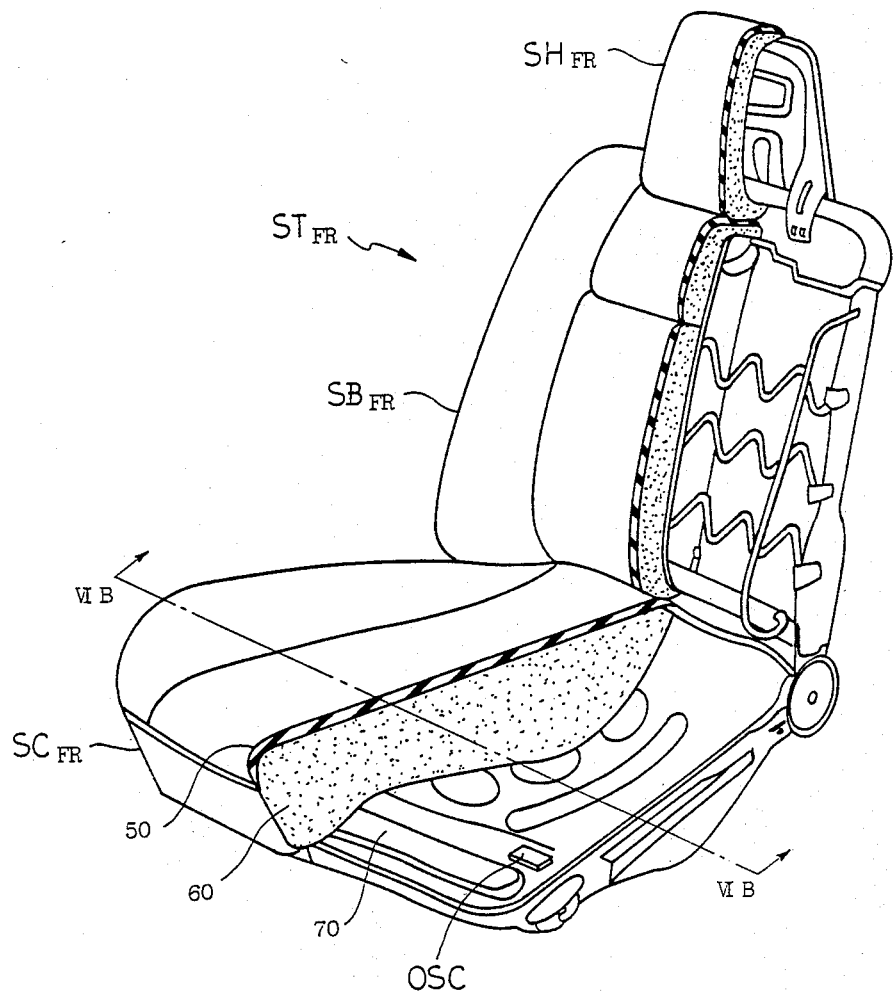
FIG. 6a is a perspective view, partly broken away, of the driver's seat $ST_{FR}$.
Figure 6B:
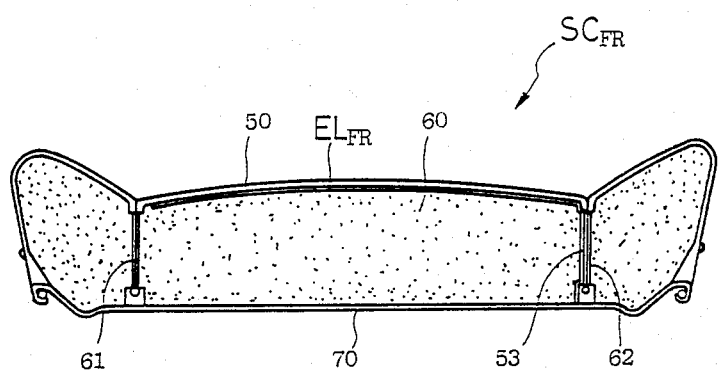
FIG. 6b is a cross section of a seat cushion $SC_{FR}$ shown in FIG. 6a taken along the line VIB—VIB thereof.

FIG. 6a is a cross section, partly broken away, of the FR seat $ST_{FR}$. The seat $ST_{FR}$ comprises a seat cushion $SC_{FR}$, a seat back $SB_{FR}$ and a head rest $SH_{FR}$, each of which is formed by fully foamed urethane sheet molded into a pad, though their support construction varies. The seat cushion $SC_{FR}$ is shown in FIG. 6b as a cross section taken along the line VIB—VIB shown in FIG. 6a or through a plane perpendicular to the running direction of the vehicle, in a region when driver MAN is seated. It comprises a pad support 70 formed of a resin on which a urethane seat cushion pad 60 covered with a trim cover assembly 50 is disposed. Where necessary, the trim cover assembly 50 is fastened to the underside of the seat cushion pad 60 by tension cords extending through holes 61 and 62 formed so as to extend through the seat cushion pad 60, and its opposite ends are fastened to the pad support 70 for retention. The seating detecting electrode $EL_{FR}$ is assembled into the trim cover assembly 50 and has a lead wire 53 which is passed through the hole 62 to the underside of the seat cushion pad 60 so as to be connected to the terminal 4 of the oscillator OSC which is mounted on the pad support 70 (not shown).

Figure 6C:
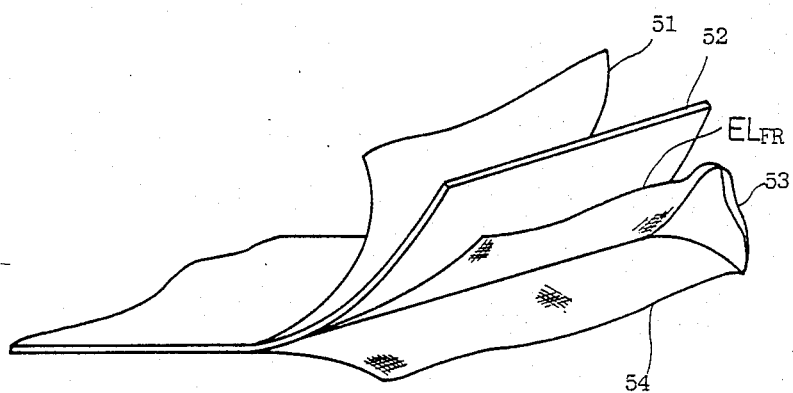
FIG. 6c is a perspective view of a trim cover assembly 50 of the seat cushion $SC_{FR}$ shown in FIGS. 6a and 6b.

FIG. 6c shows the detail of the trim cover assembly 50 in a region where the seating detecting electrode $EL_{FR}$ is assembled. Specifically, it comprises a skin 51, a wadding 52 which serves to produce the thickness effect of the trim cover assembly and is formed from a sheet of sponge material, and a wadding cover 54. The seating detecting electrode $EL_{FR}$ is formed by a conductive woven fabric which is subjected to an electroless nickel plating, and is interposed between the wadding 52 and the wadding cover 54 to be stitched as the trim cover assembly 50 is sewn. The seating detecting electrode has a size which depends on an area, the detection of which is desired, but in the present embodiment, it is sized as about 30 cm square, with its corner formed into a ribbon to define the lead wire 53. Thus it will be seen that the seating detecting electrode $EL_{FR}$ can be assembled into the trim cover assembly 50 without requiring any additional processing step. Because it conforms to other components of the trim cover assembly, the area of the assembly 50 in which the seating detecting electrode $EL_{FR}$ is assembled can be treated in the same manner as the remainder. In other words, the seating detecting electrode $EL_{FR}$ has no adverse influence upon the workability, the appearance or seating reaction.

It will be noted that the skin 51, the wadding 52 and the wadding cover 53 which form the trim cover assembly as well as the seat cushion pad 60 and the pad support 70 are all formed by insulators, and thus the seating detecting electrode $EL_{FR}$ is insulated from the electrical ground to form an occupant detecting capacitor with the ground electrode. Arrows shown in phantom lines in FIG. 5 represent electric lines of force which would be produced when a suitable voltage is applied to the occupant detecting capacitor. Since the driver MAN seated upon the seat $ST_{FR}$ links with these electric lines of force, such driver may be considered as a high dielectric member interposed between the electrodes of the occupant detecting capacitor. In other words, the occupant detecting capacitor has a capacitance which varies largely depending on the presence or the absence of the driver MAN.

In the subunit 2b which is constructed in the same manner as the subunit 2a, its oscillator is connected with a seating detecting electrode which is mounted on the FL seat, and an output terminal of the PS register is connected to a serial input port R9 of CPU 1.

Figure 7:
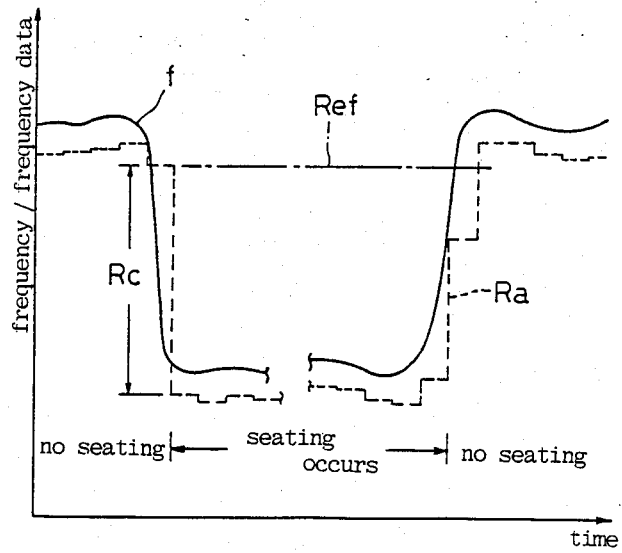
FIG. 7 graphically illustrates the principle of detecting the presence of an occupant by the microcomputer 1 shown in FIG. 3.

Referring to FIG. 7, the detection of the seating of an occupant with the apparatus of the embodiment will be described briefly. FIG. 7 graphically shows an example of a change in the oscillation frequency f of the oscillator OSC with time by a solid line, frequency data Ra which is sampled by CPU 1 by a broken line and reference data Ref established by CPU 1 by a phantom line, respectively.

CPU 1 samples the number of pulses which are output from the oscillator during the interrupt period of 0.1 second timer 3 or during a time interval of 0.1 second, and which corresponds to the oscillation frequency f of the oscillator, thereby monitoring a change in the oscillation frequency f. Specifically, frequency data Ra obtained during a current sampling is compared against old frequency data which is obtained during the immediately preceding sampling to derive change data Rc. While the oscillation frequency f of the oscillator OSC is continually changing, though slightly, there occurs a rapid reduction in the frequency to cause the change data Rc to exceed a predetermined value when the driver MAN is seated upon the seat $ST_{FR}$. Upon detection of this change, the occurrence of seating is determined, and the frequency data which was obtained before the occurrence of the reduction or obtained during the previous sampling is chosen as a reference data Ref. Subsequently, the frequency data Ra is examined. No seating is determined if frequency data Ra exceeds reference data Ref, since the frequency f returns to its original value as soon as the driver MAN leaves the FR seat $ST_{FR}$.

Figure 8:
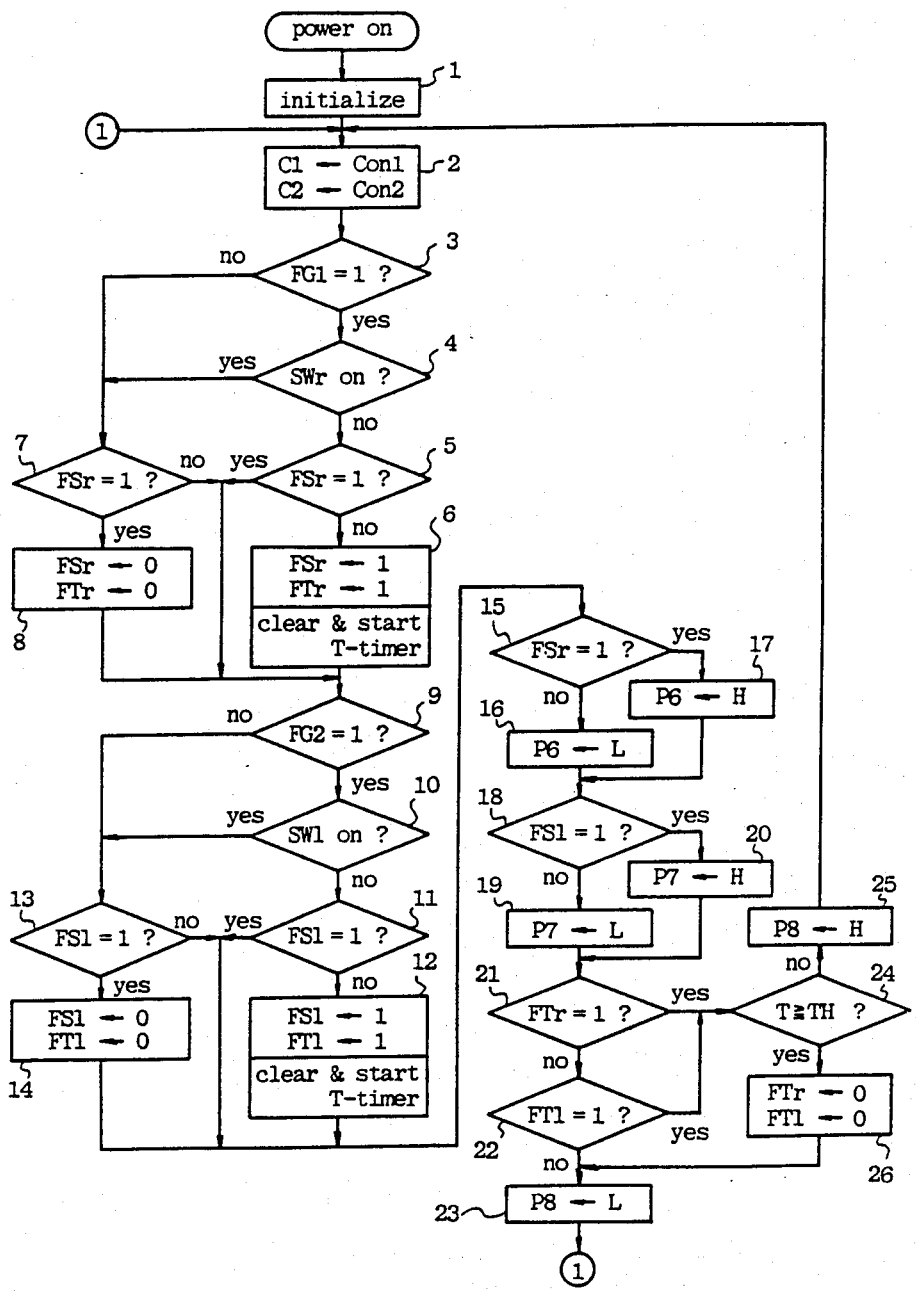
FIGS. 8 and 9 are flowcharts illustrating the operation of the microcomputer 1 shown in FIG. 3.

When an occupant on the seat $ST_{FR}$ does not wear a seat belt assembly, CPU 1 lights the alarm lamp LMr and energizes the buzzer Bz. When an occupant on the FL seat does not wear a seat belt assembly, CPU 1 lights the alarm LMl and energizes the buzzer Bz. The operation of CPU 1 will be described more specifically with reference to the flowcharts shown in FIGS. 8 and 9. When the onboard battery BT is connected with the apparatus to feed given voltages to various parts thereof, CPU 1 initializes the arrangement at step 1 (the step number being entered on the flowcharts) by resetting internal registers, input and output ports and other components. Subsequently, at step 2, given threshold values Con1 and Con2 are stored in registers C1 and C2. These threshold values are used in an interrupt operation to be described below.

Figure 9:
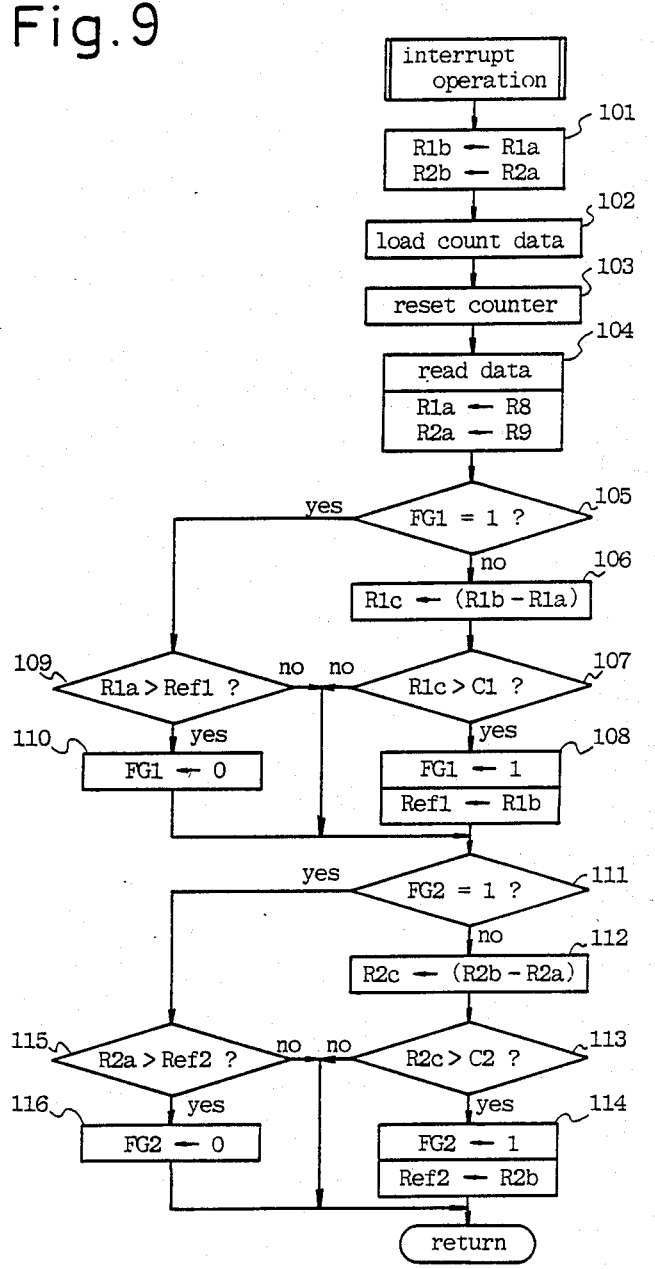

Before describing the operation which begins with step 3, an interrupt operation which is initiated by an interrupt request from the 0.1 second timer will be described first with reference to the flowchart shown in FIG. 9.

In the interrupt processing operation, data in a register R1a is stored in register R1b and data in a register R2a is stored in register R2b at step 101. As will be apparent from the following description, this data represents the frequency data obtained during the immediately preceding interrupt operation or 0.1 second before. At step 102, a shift load pulse is delivered to the shift load input terminal of PS register PSR, and count data in the counter CTR is preset therein. At step 103, a reset pulse is applied to the counter CTR, thereby resetting it. In this manner, the counter CTR counts the number of pulses developed by the oscillator OSC during the interrupt period of the timer 3.

At step 104, the clock inhibit signal which is applied to the PS register is changed to its low level (L), whereby preset data in the register PSR which is serially delivered from its output terminal OUT in synchronism with the clock pulse or data which was preset at step 102 is read at serial input ports R8 and R9, and is stored in the corresponding register R1a or R2a as frequency data.

Subsequent operation includes a routine for detecting the occurrence of seating on the seat $ST_{FR}$ and comprising steps 105 to 110 and a similar routine for FL seat comprising steps 111 to 116. Since the routines are identical, only the routine for the seat $ST_{FR}$ will be described below.

A flag FG1 indicates the occurrence or not of seating of an occupant on the seat $ST_{FR}$. It is initially assumed that the flag is reset to 0, indicating no seating. At step 106, the content of register R1a is subtracted from the content of the register R1b to provide a change data, which is written into register R1c. At step 107, the content of the register R1c (change data) is compared against a predetermined threshold value C1 which is stored in register C1. The threshold value Con1 is determined on the basis of a change in the oscillation frequency of the oscillator OSC which occurs when an occupant has actually seated on the seat $ST_{FR}$. When no occupant is seated upon the seat $ST_{FR}$, the change data will have a small value and does not exceed the threshold C1. Accordingly the program proceeds to step 111. However, when an occupant is seated, there occurs a rapid reduction in the oscillation frequency of the oscillator OSC as mentioned previously, whereby the change data exceeds the threshold C1. In this instance, the flag FG1 is set to "1" at step 108, and the content of the register R1b or the old frequency data is written into the register Ref1 as reference data.

When the flag FG1 is set, the content of the register Ref1 or the reference data is compared against the content of the register R1a or fresh frequency data during the subsequent interrupt processing operation. As mentioned, when an occupant is seated upon the seat $ST_{FR}$, any change in the oscillation frequency of the oscillator OSC is small, and hence the fresh frequency data stored in the register R1a cannot exceed reference data stored in the register Ref1. However, when the occupant who has been sitting on the seat $ST_{FR}$ gets out of the vehicle, there occurs a rapid increase in the oscillation frequency, whereby the fresh frequency data stored in the register R1a exceeds the reference data stored in the register Ref1. At this time, the flag FG1 is reset to "0" at step 110.

It is to be noted that in the routine which detects the seating on the FL seat, a flag FG2 is set or reset in response to the detection of a seating or no seating.

In this manner, the occurrence or not of a seating is detected in terms of a change per unit time in the capacitance between the seating detecting electrode and the ground electrode, thus avoiding the likelihood of an erroneous detection due to the influences of the temperature, humidity or aging effect. It is to be understood that when a baggage or the like is placed upon the seat, the corresponding change in the capacitance differs largely from that which occurs when an occupant is seated, thus avoiding an erroneous detection which might be caused by a conventional seating switch (which is assembled into the seat cushion and is turned on when a weight is applied thereon).

Returning to FIG. 8, the flag FG1 is examined at step 3. When an occupant is not seated upon the seat ST$_{FR}$, the flag FG1 is reset to 0 during the interrupt operation. In this instance, a flag FSr representing the lighted condition of the alarm lamp LMr as well as a flag FTr representing the energization of the alarm buzzer Bz are reset to 0. If the flag FSr is already reset, the step 8 is skipped.

When an occupant is seated upon the seat ST$_{FR}$, the flag FG1 has been set to 1 during the interrupt operation, and accordingly the program proceeds to step 4 where the status of the coupling detecting switch SWr is examined. As mentioned previously, if an occupant sitting on the seat ST$_{FR}$ wears his seat belt assembly, the switch SWr is turned on, whereupon the program proceeds to step 7 where the flags FSr and FTr are reset to 0.

If an occupant sitting on the seat ST$_{FR}$ is not wearing his seat belt assembly, the switch SWr is off. When this condition is detected, the flags FSr and FTr are set at step 6, and T timer (an internal timer) which determines the time duration for the energization of the alarm buzzer Bz is cleared and then started. If the flag FSr is already set, the step 6 is skipped.

The processing operation which takes place at steps 9 to 14 covers an occupant sitting on the FL seat in a manner corresponding to the operation which has taken place at step 3 to 8, and therefore will not be described since it can be understood mutatis mutandis.

Flag FSr is examined at step 15. If this flag is reset, an L level is delivered from the output port P6 to command the lamp driver Drv1 to extinguish the alarm lamp LMr at step 16. If the flag is set, an H level is delivered from the output port P6 to command the lamp driver Drv1 to light the alarm lamp LMr at step 17.

Similarly, flag FSl is examined at step 18, if this flag is reset, an L level is delivered from the output port P7 to command the lamp driver Drv1 to extinguish the alarm lamp LMl while if the flag is set, an H level is delivered from the output port P7 to command the lamp driver Drv1 to light the alarm lamp LMl at step 20.

Flag FTr is examined at step 21, and flag FTl is examined at step 22. If both of these flag are reset, an L level is delivered from the output port P8 to command the buzzer driver Drv2 to deenergize the alarm buzzer Bz at step 23. However, if either one of these flags is set, the program proceeds to step 24 where the count in the T timer is examined. If the count in the T timer is less than a predetermined time interval TH, which is chosen to be about 5 seconds in the present embodiment, an H level is delivered from the output port P8 to command the buzzer driver Drv2 to energize the alarm buzzer Bz at step 25. If the count exceeds the given time interval TH, an L level is delivered from the output port P8 to command the buzzer driver Drv2 to deenergize the alarm buzzer Bz at step 26.

The operation of the first embodiment may be summarized as follows. When an occupant seats on the seat ST$_{FR}$, a warning is given to urge the occupant to wear the seat belt assembly by means of the alarm lamp LMr and the alarm buzzer Bz, until he couples the tongue plate 11 and the buckle 17 of the seat belt assembly together. When an occupant seats on the FL seat, a similar warning is given by means of the alarm lamp LMl and the alarm buzzer Bz, urging that occupant to wear his seat belt assembly until he couples the tongue plate and the buckle together. It will be noted that the alarm buzzer Bz is energized for a limited time interval.

In the described embodiment, there is a difficulty in detecting improper wearing of the seat belt assembly. By way of example, there is improper wearing if the tongue plate 11 and the buckle 17 are coupled together before an occupant becomes seated or if the webbing 10 is extended around his back. In the described embodiment, such improper wearing cannot be detected.

Figure 10A:
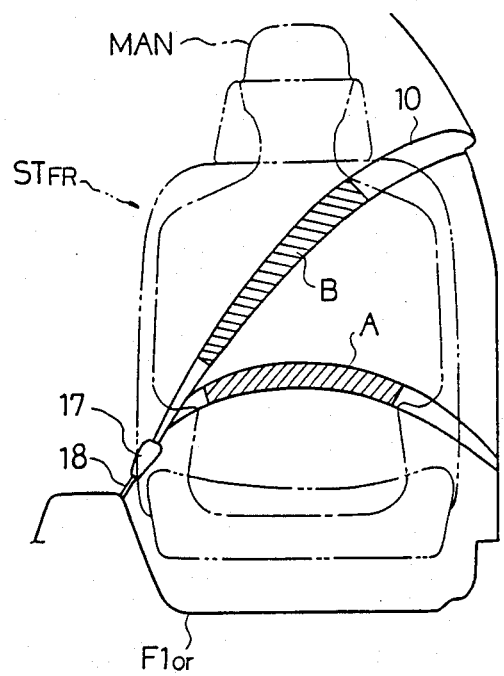
FIG. 10a is a rear view of the driver's seat $ST_{FR}$ in a second embodiment of the invention, illustrating the disposition of a first electrode 10a assembled into a webbing 10.
Figure 10B:
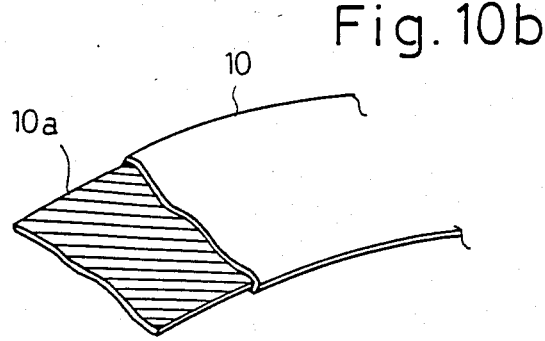

In a second embodiment, a relationship between the webbing and an occupant sitting on a selected seat is analyzed in addition to the foregoing features of the above embodiment. Specifically, utilizing the principle of seating detection discussed above, a capacitance defined between the webbing and a detecting electrode which is assembled into part of an associated seat is monitored in order to see if part of the physical body of an occupant sitting on that seat is disposed between the webbing and the seat or if the webbing is properly disposed or laced (hereafter referred to as the detection of a lacing). The second embodiment is similar to the first embodiment in many respects, and similar parts as before are designated by like reference characters. Referring to FIGS. 10a and 10b, a difference of the second embodiment over the first embodiment will be described. In the second embodiment, the webbing 10 comprises a double-woven band containing a belt core therein. Both the band and the core comprise a woven nylon fabric. A portion of the belt core located in the region A which will be wrapped around the waist of a driver when he has worn the seat belt assembly in a proper manner is applied with an electroless nickel plating to define a belt electrode 10a. Since the electroless nickel plating has little influence upon the strength or flexibility of the belt core, the webbing 10 which is worked in this manner can be treated in a similar manner as a usual webbing.

The nylon material which forms the webbing 10 is an insulating material, and the belt electrode 10a is insulated from the electrical ground as represented by the car body such as a roof ROOF or a floor Flor and from a detecting electrode EL$_{FR}$ which is mounted in the seat cushion SC$_{FR}$ of the seat ST$_{FR}$ in the similar manner as in the first embodiment. In this manner, the combination of the belt electrode 10a and the detecting electrode EL$_{FR}$ forms a lacing detecting capacitor having a first capacitance when an occupant sitting on the seat ST$_{FR}$, or a driver MAN, is properly wearing a seat belt assembly in a manner indicated in FIG. 10a, and having a second different capacitance when the seat belt assembly is improperly worn, for example, when sitting over the webbing 10 or when the webbing 10 is laced around his back.

Thus, in the second embodiment, the capacitances formed between the ground electrode, the belt electrode 10a and the detecting electrode EL$_{FR}$ are monitored to detect the seating of an occupant on the seat ST$_{FR}$, and the capacitance between the belt electrode 10a and the detecting electrode EL$_{FR}$ is monitored to provide a lacing detection (or analysis of the relationship between the driver MAN and the webbing 10).

While not shown, the FL seat and its associated seat belt assembly are similarly provided with electrodes which function in the same manner as the second and the first electrodes.

Figure 11:
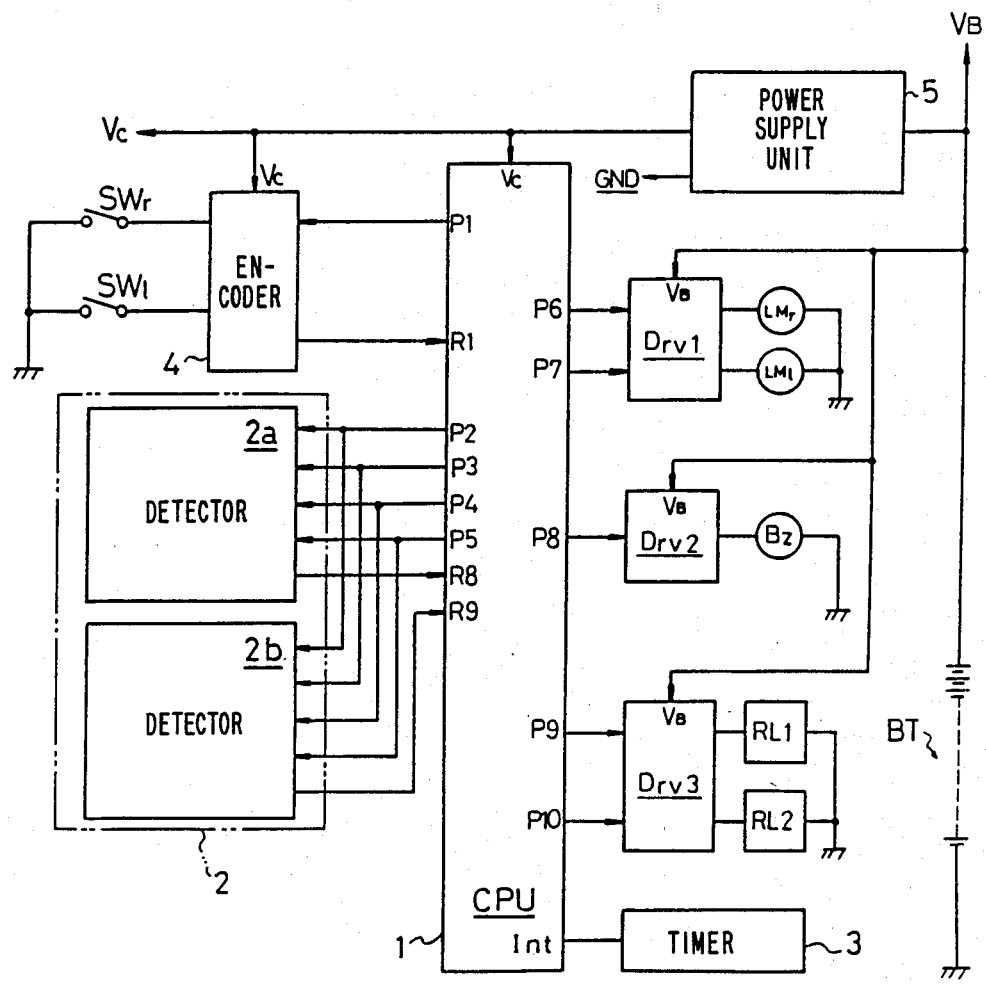
FIG. 11 is a block diagram of an apparatus for detecting the wearing condition of a seat belt assembly which forms part of a second embodiment of the invention.
Figure 12:
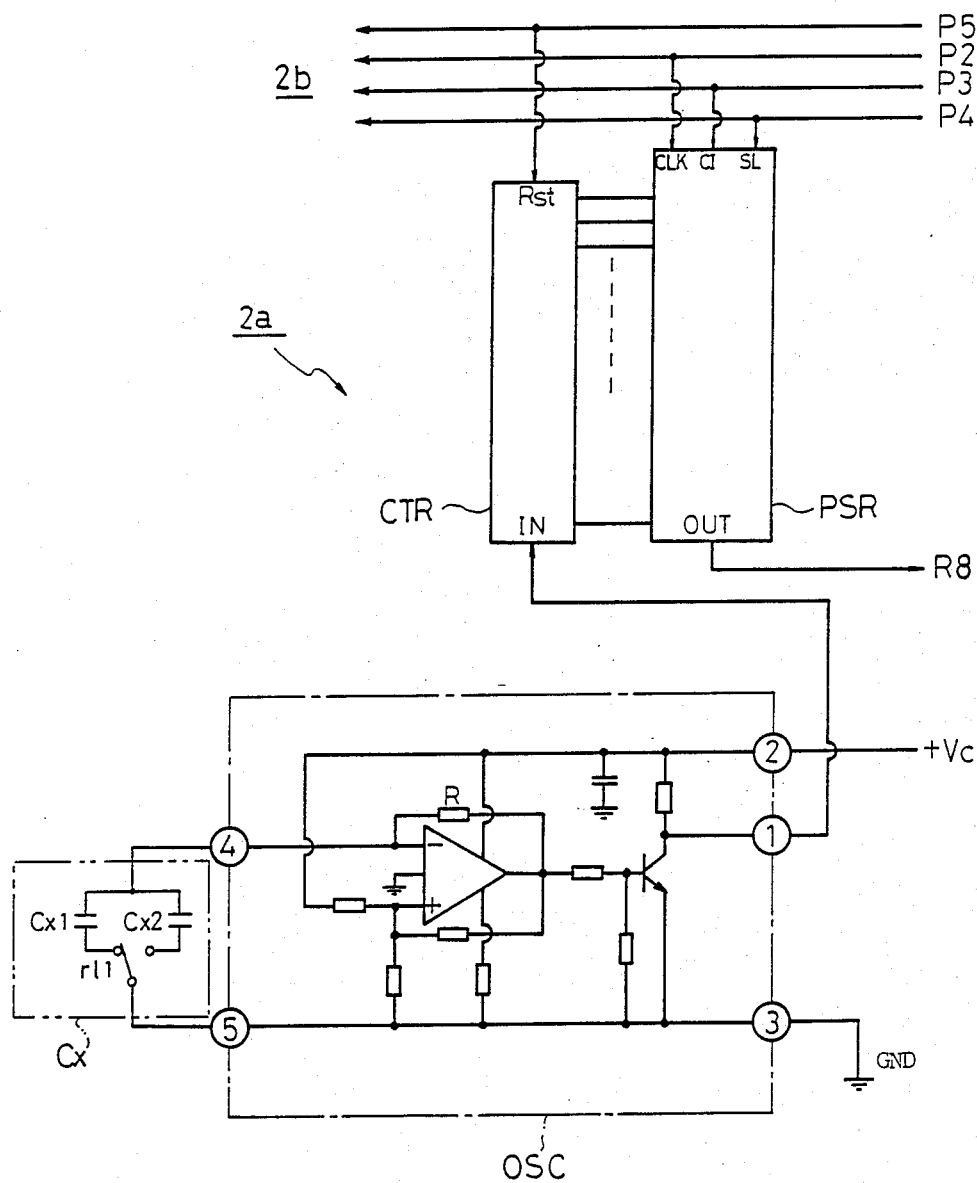
FIG. 12 is a block diagram of a subunit 2a shown in FIG. 11.

FIG. 11 is a block diagram of an apparatus for detecting the wearing condition of a seat belt assembly according to the second embodiment. It will be seen from FIG. 11 that the apparatus of the second embodiment additionally includes a relay driver Drv3 and relays RL1, RL2 which are connected thereto. Each of the relays RL1 and RL2 comprises a two pole relay, and the relay driver Drv3 energizes the relay RL1 when an output port P9 of CPU 1 assumes an H level, energizes the relay RL2 when an output port P10 assumes an H level, and deenergizes a corresponding relay when the respective output port assumes an L level. The relays RL1, RL2 have relay contacts which are disposed within the subunit 2a or 2b. The both subunits are similar in construction, and therefore only the subunit 2a will be described in detail with reference to FIG. 12.

The subunit 2a is arranged in the identical manner as the unit or section 2a shown in FIG. 4 in connection with the first embodiment except for an external capacitor Cx, and includes an oscillator OSC, a counter CTR and PS register PSR, which function in the same manner as before. The external capacitor Cx comprises a seating detecting capacitor Cx1 formed by a detecting electrode $EL_{FR}$ and the ground electrode, a wearing detecting capacitor Cx2 formed by the detecting electrode $EL_{FR}$ and the belt electrode 10a, and a relay contact rl1 associated with the two-pole relay RL1.

Specifically the detecting electrode $EL_{FR}$ is connected to the terminal number 4 while the fixed terminal of the relay contact rl1 of the two-pole relay RL1 is connected to the terminal number 5 of the oscillator OSC while the other terminal of the relay contact rl1 is selectively connected to either the ground electrode belt or the electrode 10a. The relay contact rl1 contacts the ground electrode when the relay RL1 is deenergized, and contacts the belt electrode 10a when the relay is energized. Accordingly, the oscillator OSC develops a signal of a frequency which corresponds to the occurrence or not of a seating on the FR seat $ST_{FR}$ when the relay RL1 is deenergized, and develops a signal of a frequency which depends on the wearing or lacing manner of the webbing 10 when the relay is energized.

In the subunit 2b which is not specifically illustrated, the relay contact of the relay RL2 selects the seating detecting capacitor on the FL seat or the wearing detecting capacitor which detects the wearing or lacing manner of the webbing of the seat belt assembly associated with the FL seat for connection with the oscillator OSC.

In the second embodiment, CPU 1 examines a seating of an occupant on the seat $ST_{FR}$, the coupling between the tongue plate 11 and the buckle 17 and the manner of wearing the webbing. It also examines a seating of an occupant on the FL seat, the coupling between the tongue plate and the buckle and the manner of wearing the webbing. If one or two of the seating, the coupling and the wearing are detected with respect to the seat $ST_{FR}$, CPU 1 determines the occurrence of an anomaly in the wearing manner, thus lighting the alarm lamp LMr and energizing the buzzer Bz. When one or two of the seating, the coupling, and the wearing are detected with respect to the FL seat, CPU 1 determines the occurrence of an anomaly in the wearing manner, thus lighting the alarm lamp LMl and energizing the buzzer Bz. It will be apparent from the inspection of FIG. 10a that the wearing cannot occur without the seating in view of the disposition of the respective electrodes, and hence such combination is not taken into consideration.

Figure 13:
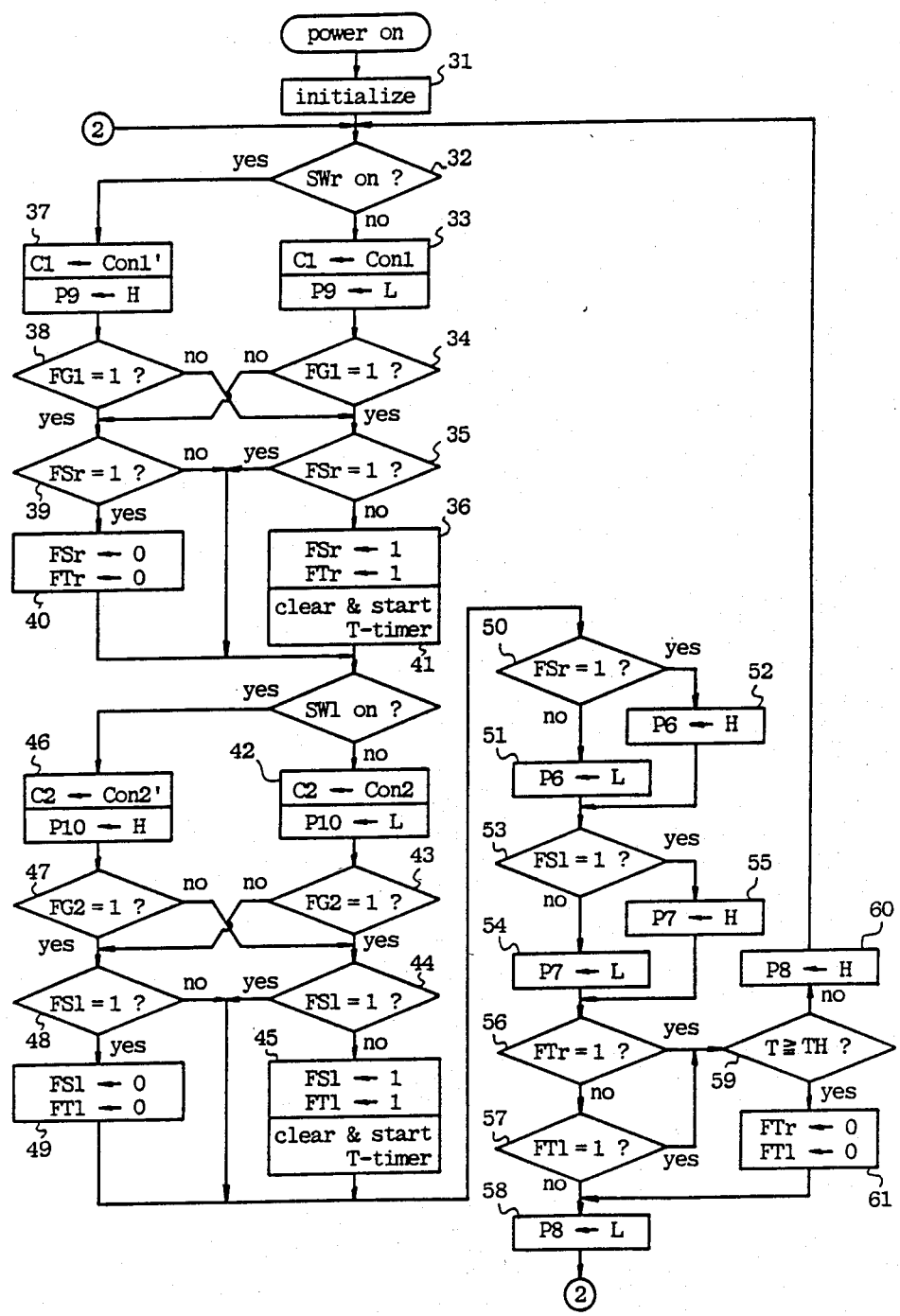
FIG. 13 is a flowchart illustrating the operation of the microcomputer 1 shown in FIG. 11.

A specific operation of CPU 1 in the second embodiment will now be described with reference to a flow-chart shown in FIG. 13. When an onboard battery BT is connected with the arrangement of the invention to feed given voltages to various parts, CPU 1 initializes internal registers, input and output ports and various components at step 31. As mentioned previously, the coupling detecting switch SWr detects the occurrence of a coupling between the tongue plate 11 and the buckle 17 of the seat belt assembly associated with the seat $ST_{FR}$, and when this switch is off, the program proceeds from step 32 to step 33 where a threshold value Con1 is stored in the register C1 and delivers an L level at the output port P9 to command the relay deliver Drv3 to deenergize the relay RL1. When the relay RL1 is deenergized, the seating detecting capacitor Cx1 is connected to the oscillator OSC of the subunit 2a shown in FIG. 12, and accordingly the oscillator OSC oscillates at frequency which depends on the seating or not of an occupant on the seat $ST_{FR}$. As mentioned before, the threshold value Con1 is determined on the basis of a change in the oscillation frequency caused by a seating of an occupant when the occupant detecting capacitor Cx1 is connected to the oscillator OSC. Accordingly, in response to an interrupt request from the timer 3, CPU 1 performs an interrupt operation illustrated in FIG. 9 to detect the occurrence or not of a seating of an occupant on the seat $ST_{FR}$. When a seating is detected, a flag FG1 is set to "1" while the flag is reset to "0" when a seating is not detected. For a detailed description of the interrupt operation, reference is directed to the previous description thereof.

A flag FG1 is examined at step 34. If this flag is set, this means that an occupant sitting on the seat $ST_{FR}$ or the driver has not yet coupled the tongue plate 11 and the buckle 17 of his seat belt assembly. Accordingly, a flag FSr which indicates the lighting of the alarm lamp LMr as well as a flag FTr which indicates the energization of the alarm buzzer Bz are set at step 36 while clearing and restarting a T timer. When the flag FSr is set, the step 36 is skipped.

When it is found at step 34 that flag FG1 is reset, this means that there is no occupant sitting on the seat $ST_{FR}$, and accordingly, there can be no anomaly if the switch SWr is off, indicating that the tongue plate 11 and the buckle 17 are not coupled together. In this instance, flags FSr and FTr are reset at step 40. If the flag FSr has already been reset, the step 40 is skipped.

If it is found at step 32 that the coupling detecting switch SWr is on, the program proceeds to step 37 where a threshold value Con1' is stored in a register C1 and an H level is delivered to the output port P9, commanding the relay driver Drv3 to energize the relay RL1. When the relay RL1 is energized, the wearing detecting capacitor Cx2 is connected to the oscillator OSC of the subunit 2a shown in FIG. 12, and hence the oscillator OSC oscillates at frequency which depends on the lacing condition of the webbing 10. The threshold value Con2 is determined on the basis of a change in the oscillation frequency caused by a lacing of the webbing 10 when the capacitor Cx2 is connected to the oscillator OSC. Accordingly, in response to an interrupt request from the timer 3, CPU 1 performs the interrupt operation shown in FIG. 9 to see if the webbing 10 is or is not properly laced around the physical body of the occupant. If a proper lacing is detected, a flag FG1 is set to "1" while it is reset to "0" if a proper lacing condition is not detected. The interrupt operation is similar to that mentioned previously except for a decision element, and hence reference is directed to the previous description for detail.

The flag FG1 is examined at step 38. If this flag is set, this means that an occupant sitting on the seat $ST_{FR}$ or the driver has properly laced the webbing 10 around his physical body, thus representing a proper wear of the seat belt assembly. In this instance, flags FSr and FTr are reset at step 40. If the flag FSr is already reset, the step 40 is skipped.

If it is found at step 38 that the flag FG1 is reset, this means that an occupant sitting on the seat $ST_{FR}$ or the driver has not yet properly worn his seat belt assembly. In this instance, flags FSr and FTr are set at step 36, and T timer is cleared and restarted. If the flag FSr has already been set, the step 36 is skipped.

Operations at steps 41 to 49 cover an occupant sitting on the FL seat for a series of operations which have taken place at steps 32 to 40, and hence will not be specifically described.

Flag FSr is examined at step 50. If this flag is reset, an L level is delivered to the output port P6 to command the lamp driver Drv1 to extinguish the alarm lamp LMr at step 51. If the flag is set, an H level is delivered to the output port P6 to command the lamp driver Drv1 to light the alarm lamp LMr at step 52.

Similarly, flag FSl is examined at step 53. If this flag is reset, an L level is delivered to the output port P7 to command the lamp driver Drv1 to extinguish the alarm lamp LMl. If this flag is set, an H level is delivered to the output port P7 to command the lamp driver Drv1 to light the alarm lamp LMl at step 55.

Flag FTr is examined at step 56 and flag FTl is examined at step 57. If both of these flags are reset, an L level is delivered to the output port P8 to command the buzzer driver Drv2 to deenergize the alarm buzzer Bz at step 58. However, if one of these flags is set, the program proceeds to step 59 where the count in the T timer is examined. If the count is less than a predetermined time interval TH (which is chosen to be equal to about 5 seconds in the present embodiment), an H level is delivered to the output port P8 to command the buzzer driver Drv2 to energize the alarm buzzer Bz at step 60. However, if the count is equal to or greater than the time interval TH, an L level is delivered to the output port P8 to command the buzzer driver Drv2 to deenergize the alarm buzzer Bz at step 61.

To summarize, in the second embodiment, an anomaly in the wearing manner of the seat belt assembly is annunciated by means of the alarm lamp and the alarm buzzer, for a limited time interval, when (1) an occupant has not seated, but the tongue plate and the buckle of the corresponding seat belt assembly are coupled together, (2) an occupant has seated, but the tongue plate and the buckle of the corresponding seat belt assembly are not coupled together, or (3) the tongue plate and the buckle are coupled together, but the webbing is not properly laced around the physical body of an occupant.

In the second embodiment, the belt electrode 10a is assembled into a region A of the webbing 10 which will be wrapped around the waist of an occupant MAN sitting on the seat $ST_{FR}$ when he has properly worn the seat belt assembly. However, this belt electrode may be assembled into a region B of the webbing which will be properly wrapped around the breast of the occupant MAN or may be assembled into the entire seat belt 10 without distinction to the region A or B. In such instance, the detecting electrode, which forms a pair with the belt electrode, may be assembled into the seat back $SB_{FR}$ (see FIG. 5) depending on the assembled position of the belt electrode.

If a unit which detects the seating by means of the seating detector capacitor Cx1 and a unit which detects the lacing condition by the lacing detecting capacitor Cx2 are separately provided, a switching operation through the relay RL1 may be dispensed with.

Alternatively, when detecting the seating or the lacing condition, the absolute magnitude of the frequency may be used rather than a change in the oscillation frequency of the oscillator OSC. In such instance, a frequency-voltage converter and a voltage comparator may be provided so that a voltage which is proportional to an output frequency from the oscillator OSC may be compared against a given voltage value.

Furthermore, an alarm by means of a buzzer Bz used in the first and the second embodiment may be replaced by a voicing alarm to each occupant sitting on the respective seats. Also, the apparatus of the invention may also be applied to a seat belt used in an aircraft.

From the foregoing description, it will be appreciated that the invention enables an exact detection of a wearing condition of a seat belt assembly since an analysis of the relationship between a seat belt assembly and an occupant sitting on that seat is taken into consideration. Thus, a preferred mode of the seat belt assembly when a personnel is seated upon a seat is different from a preferred mode when no personnel is seated. However, the invention enables an anomaly to be detected by rendering different decisions in the respective instances. This could not have been achieved with a conventional technique in which a wearing condition has been detected by merely watching the mechanical coupling of the seat belt assembly. For example, in such instance, an alarm may be given off for a vacant seat on which no personnel is seated. However, it will be appreciated from the above description that such inconvenience is completely eliminated in accordance with the invention.

As detailed in the above description, the analysis of the relationship between the webbing and a personnel sitting on a seat enables an anomaly in the wearing manner to be detected such as sitting over the webbing after he has coupled the seat belt assembly together. This represents a significant feature of the invention over the prior art.

What We Claimed Is:

1. In a vehicle including a seat and a seat belt, an apparatus for detecting whether an occupant seated on said seat is wearing said seat belt, said apparatus comprising:

a seat belt assembly including said belt which may be disposed around said occupant;

a belt electrode positioned along at least a portion of said belt;

a detecting electrode positioned so as to produce an electric field between said belt electrode and said detecting electrode and passing through at least part of said occupant when said belt is disposed around said occupant;

capacitance detecting means for detecting the capacitance formed between said belt electrode and said detecting electrode; and monitoring means responsive to changes in the detected capacitance for monitoring the detected capacitance to determine whether said belt is disposed around said occupant.

2. An apparatus according to claim 1 in which the belt electrode is disposed in at least a portion of a webbing which comprises said belt.

3. An apparatus according to claim 1 in which said detecting electrode is disposed in at least a portion of said seat.

4. An apparatus according to claim 1 in which said belt electrode is disposed in at least a portion of a webbing which comprises said belt and said detecting electrode is disposed in at least a portion of said seat.

5. An apparatus according to claim 1 in which said monitoring means determines that the seat belt assembly is disposed around said occupant if the detected capacitance increases and determines that the seat belt assembly is not disposed around said occupant if the detected capacitance decreases.

6. An apparatus according to claim 5 in which said monitoring means determines that the seat belt assembly is disposed around said occupant if the increase per unit time of the detected capacitance exceeds a predetermined value.

7. In a vehicle including a seat and a seat belt, an apparatus for detecting whether an occupant of said seat is wearing said seat belt, said apparatus comprising:
a seat belt assembly including selectively engagable fastening means for selectively fastening said seat belt assembly;
fastening detecting means for providing a first positive detection when the seat belt assembly is fastened;
seating detecting means for providing a second positive detection when an occupant is seated on the vehicle seat, said seating detecting means comprising a seating detecting electrode and a ground electrode positioned to define an electric field which passes through at least part of an occupant of said vehicle seat, capacitance detecting means for detecting the capacitance between said seating detecting electrode and said ground electrode, and monitoring means for monitoring the detected capacitance, said monitoring means determining that an occupant is seated on said vehicle seat if an increase per unit time of the detected capacitance exceeds a predetermined value;
decision means for determining an anomaly in the wearing of the seat belt assembly when only one of the first and the second positive detections is provided; and
output means for out-putting the determination of said decision means.

8. An apparatus according to claim 7 in which said belt comprises a webbing and said fastening means comprises a tongue plate coupled with said webbing and a buckle which selectively engages said tongue plate.

9. An apparatus according to claim 8 in which said fastening detecting means comprises means for detecting when said tongue plate is engaged with said buckle.

10. An apparatus according to claim 8 in which said fastening detecting means comprises a switch mounted on said buckle which is switched on and off by said tongue plate.

11. An apparatus according to claim 7 in which said seating detecting electrode is disposed in at least part of said vehicle seat.

12. An apparatus according to claim 11 in which said ground electrode comprises the body of said vehicle.

13. An apparatus according to claim 7 in which the output means includes annunciator means and energization means for energizing the annunciator means, the energization means energizing the annunciator means when the decision means determines the occurrence of an anomaly in the wearing of said seat belt assembly.

14. An apparatus according to claim 13 in which the annunciator means comprises visual annunciator means.

15. An apparatus according to claim 13 in which the annunciator means comprises audible annunciator means.

16. An apparatus according to claim 13 in which the annunciator means comprises visual annunciator means and audible annunciator means.

17. In an automobile including a seat and a seat belt assembly, said seat belt assembly including a belt which may be disposed around a passenger of said automobile, an apparatus for detecting whether said passenger is wearing said seat belt assembly, said apparatus comprising:
a belt electrode positioned along at least a portion of said belt;
a detecting electrode, spaced from said belt electrode, and positioned to produce an electric field between said belt electrode and said detecting electrode; and
monitoring means responsive to changes in the detected capacitance for monitoring the detected capacitance to determine whether a passenger is positioned between said belt electrode and said detecting electrode.

18. In an automobile including a seat and a seat belt assembly, the seat belt assembly including a belt which may be disposed around a passenger of said automobile and a belt electrode positioned along at least a portion of said belt, said automobile further including a detecting electrode disposed therein, a method of sensing whether a passenger is wearing said seat belt assembly comprising the steps of:
detecting the capacitance formed between said belt electrode and said detecting electrode; and
monitoring the detected capacitance to determine whether a passenger is positioned between said belt electrode and said detecting electrode.

19. In a vehicle including a seat and a seat belt, an apparatus for detecting whether an occupant of said seat is properly wearing said seat belt of the vehicle seat, said apparatus comprising:
a seat belt assembly including said belt which may be disposed around said occupant and a selectively engagable fastening means for selectively fastening said seat belt assembly, said seat belt assembly being properly worn when said fastening means is engaged and said belt is disposed around said occupant;
fastening detecting means for providing a first positive detection when the seat belt assembly is fastened;
seating detecting means for providing a second positive detection when said occupant is seated on the vehicle seat;
lacing detecting means for providing a third positive detection when said belt is disposed around said occupant;
decision means for determining an anomaly in the wearing of the seat belt assembly when only one or two of the first, the second, and the third positive detections are provided; and p1 output means for outputting the determination of the decision means.

20. An apparatus according to claim 19 in which the output means comprises annunciator means and energization means for energizing the annunciator means, the energization means energizing the annunciator means when the decision means determines the occurrence of an anomaly in the wearing of said seat belt assembly.

21. An apparatus according to claim 20 in which the annunciator means comprises visual annunciator means.

22. An apparatus according to claim 20 in which the annunciator means comprises audible annunciator means.

23. An apparatus according to claim 20 in which the annunciator means comprises visual annunciator means and audible annunciator means.

24. An apparatus according to claim 19 in which said seating detecting means comprises a seating detecting electrode and a ground electrode positioned so as to define an electric field which passes through at least part of an occupant seated on said vehicle seat, capacitance detecting means for detecting the capacitance between said seating detecting and said ground electrode, and monitoring means for monitoring the detected capacitance to determine whether an occupant is seated on said vehicle seat.

25. An apparatus according to claim 24 in which said monitoring means determines that an occupant is seated on said vehicle seat in response to an increase in the detected capacitance and determines that no occupant is seated on said vehicle seat in response to a decrease in the detected capacitance.

26. An apparatus according to claim 25 in which said monitoring means determines that an occupant is seated on said vehicle seat if the increase per unit time of the detected capacitance exceeds a predetermined value.

27. An apparatus according to claim 24 in which said seating detecting electrode is disposed in at least part of the seat.

28. An apparatus according to claim 27 in which said ground electrode comprises the body of the vehicle.

29. An apparatus according to claim 20 in which said lacing detecting means comprises a belt electrode positioned along at least a portion of said belt and a detecting electrode positioned to define an electric field passing through at least part of an occupant of said vehicle seat when said belt is disposed around said occupant, capacitance detecting means means for detecting the capacitance between said belt and said detecting electrodes, and monitoring means for monitoring the detected capacitance and for determining whether said belt is disposed around said occupant.

30. An apparatus according to claim 29 in which said belt electrode is disposed in at least part of a webbing which comprises said belt.

31. An apparatus according to claim 29 in which the detecting electrode is mounted in at least part of said vehicle seat.

32. An apparatus according to claim 29 in which said belt electrode is disposed in at least part of a webbing which comprises said belt and the detecting electrode is mounted in at least part of said vehicle seat.

33. An apparatus according to claim 29 in which said monitoring means determines that said belt is disposed around an occupant of said vehicle seat in response to an increase in the capacitance detected by said capacitance detecting means, and determines that said belt is not disposed around an occupant of said vehicle seat in response to a decrease in the capacitance detected by said capacitance detecting means.

34. An apparatus according to claim 33 in which said monitoring means determines that at least part of said belt is disposed around an occupant of said vehicle seat if the increase per unit time of the detected capacitance exceeds a predetermined value.

35. An apparatus according to claim 19 in which said belt comprises a webbing and said fastening means comprises a tongue plate coupled with said webbing and a buckle for selectively engaging said tongue plate.

36. An apparatus according to claim 35 in which said fastening detecting means comprises means for detecting when said tongue plate is engaged with said buckle.

37. An apparatus according to claim 35 in which said fastening detecting means comprises a switch mounted on said buckle which is switched on and off by said tongue plate.

38. In a vehicle including a seat and a seat belt, an apparatus for detecting whether an occupant of said seat is properly wearing said seat belt, said apparatus comprising:
   a seat belt assembly including said belt which may be disposed around an occupant of said vehicle seat and a selectively engagable fastening means for selectively fastening said seat belt assembly, said seat belt assembly being properly worn when said fastening means is engaged and said belt is disposed around said occupant;
   fastening detecting means for determining when the seat belt assembly is fastened;
   a detecting electrode mounted in the vehicle seat;
   a ground electrode maintained at ground potential and positioned to define an electric field between the detecting electrode and the ground electrode and passing through at least part of an occupant seated on the vehicle seat;
   a belt electrode insulated from the ground electrode and positioned to define an electric field between the detecting electrode and the belt electrode and passing through at least part of an occupant seated on the vehicle seat when said belt is disposed around said occupant;
   first capacitance detecting means for detecting the capacitance between said ground electrode and said detecting electrode;
   second capacitance detecting means for detecting the capacitance between said detecting electrode and said belt electrode;
   monitoring means for monitoring changes in capacitance detected by the first capacitance detecting means to determine whether an occupant is seated on said vehicle seat and for monitoring changes in the capacitance detected by said second capacitance detecting means to determine whether said belt is disposed around an occupant of said vehicle seat;
   decision means responsive to said monitoring means and said fastening detecting means for determining whether said seat belt assembly is properly worn; and
   output means for outputting the determination of the decision means.

39. An apparatus according to claim 38 in which said monitoring means includes selection means for selecting one of said first capacitance detecting means and said second capacitance detecting means.

40. An apparatus according to claim 38 in which said belt comprises a webbing and said fastening means comprises a tongue plate coupled with said webbing and a buckle for selectively engaging said tongue plate.

41. An apparatus according to claim 40 in which said fastening detecting means comprises means for detecting when said tongue plate is engaged with said buckle.

42. An apparatus according to claim 40 in which said fastening detecting means comprises a switch mounted on said buckle which is switched on and off by said tongue plate.

43. An apparatus according to claim 38 in which said monitoring means determines that an occupant is seated on said vehicle seat in response to an increase in the capacitance between the detecting electrode and said ground electrode and determines that no occupant is seated on said vehicle seat in response to a decrease in the capacitance detected by said first capacitance detecting means, said monitoring means also determining that at least part of said belt is disposed around an occupant of said vehicle seat in response to an increase in the capacitance between the detecting electrode and said belt electrode and determining that said belt is not disposed around an occupant of said vehicle seat in response to a decrease in the detected capacitance.

44. An apparatus according to claim 43 in which said monitoring means determines that an occupant is seated on said vehicle seat if the increase per unit time of the capacitance between the detecting electrode and said ground electrode exceeds a first predetermined value and determines that at least part of said belt is disposed around an occupant of said vehicle seat if the increase per unit time of the capacitance formed between the detecting electrode and said belt electrode exceeds a second predetermined value.

45. An apparatus according to claim 38 in which said ground electrode comprises the body of the vehicle.

46. An apparatus according to claim 38 in which said belt electrode is disposed in at least part of a webbing which comprises said belt.

47. An apparatus according to claim 38 in which the output means comprises annunciator means and energization means for energizing the annunciator means, the energization means energizing the annunciator means when the decision means determines the occurrence of an anomaly in the wearing of said seat belt assembly.

48. An apparatus according to claim 47 in which the annunciator means comprises visual annunciator means and audible annunciator means.

49. An apparatus according to claim 47 in which the annunciator means comprises visual annunciator means.

50. An apparatus according to claim 47 in which the annunciator means comprises audible annunciator means.

* * * * *